United States Patent Office 3,211,807
Patented Oct. 12, 1965

3,211,807
PROCESS FOR OBTAINING A BLEND OF A POLYAMIDE AND A POLY(N-VINYL AMIDE)
George Alexander Gillies, Berkeley, Calif., and Georges Pamm, Wilmington, Del., assignors to E. I. du Pont de Nemours and Company, Wilmington, Del., a corporation of Delaware
No Drawing. Filed Apr. 3, 1962, Ser. No. 184,673
3 Claims. (Cl. 260—857)

This invention relates to melt blending certain condensation and addition polymers. More particularly, it relates to preparing homogenous melt blends of polyamides and poly(N-vinyl amide) and dispersions of polystyrene in said blends.

Polyamides and polyvinyl amides are known in the art. These two types of polymers have some similar structural units, and it might be predicted that they would be compatible in the melt. This has been found to be experimentally true, when the polyvinyl amide had been polymerized with rigorous exclusion of oxygen. Commercial polyvinyl lactam such as polyvinylpyrrolidone, however, contains active oxygen which appears to react at polyamide melting temperatures to cause branching or cross-linking, the polyvinyl lactam thereby becoming incompatible with the nylon. Thus, attempts to melt blend these two types of polymers commercially have not resulted in a homogeneous and melt-spinnable blend. Polyamides, and polystyrene are also incompatible in that good dispersions of polystyrene in a polyamide have not been known.

A general object of this invention is to provide a homogenous melt blend of a polyvinyl amide and a polyamide derived from an amino acid or lactam, and a process for the preparation of these blends.

A specific object is to provide a homogenous melt spinnable blend of poly(caproamide) and polyvinyl pyrrolidone.

A futher object is to prepare an improved dispersion of polystyrene in a modified polyamide.

These and other objects will become apparent in the course of the following specification and claims.

These objects are accomplished by a non-aqueous melt polymerization of a polyamide-forming amino acid or lactam in the presence of a solution of a poly(N-vinyl amide) dissolved in a polyamide-forming amino acid or lactam. Preferably the polyvinyl amide solution is present in the polymerizing mixture no later than the early stages of the polymerization. Thereafter, the polymerization is continued to completion, i.e., high molecular weight, following conventional techniques. Polystyrene may be dispersed in these blends of polyamide and polyvinyl amide by agitation at elevated temperature.

The product of this process is a homogenous, melt-spinnable blend of a linear polycarbonamide in which the amide linkages are an integral part of the polymer chain, and a poly(vinyl amide), which contains amide groups which are attached to the vinyl polymer chain. Filaments spun from such blends have improved crease recovery as compared to those made from unmodified polyamide.

When polystyrene is also added, this polymer is more uniformly dispersed in the nylon matrix than was heretofore possible.

The preferred method of adding the polyvinyl amide is to simply dissolve it in the molten polyamide-forming amino acid or lactam prior to the polymerization of the latter. Alternatively, however, the polyvinyl amide may be added to the polymerizing component as a concentrated solution in the polyamide-forming amino acid or lactam at any time during the polymerization. Addition during the final stages of the polymerization may temporarily reduce the average molecular weight of the polyamide by amide interchange, so that the final stages of the polymerization may have to be extended to obtain a high molecular weight product. Hence, the solution of polyvinyl amide in amino acid or lactam is preferably introduced during the early stages of the nylon polymerization.

The melt polymerization of the amino acid or lactam is carried out by heating at temperatures of about 185° C. to about 300° C., the exact temperature employed depending on the type and amount of catalyst (if any), the reactivity and melting point of the amino acid or lactam, and the melting point of the polyamide. In general, copolyamides may be polymerized at the lower temperatures of the disclosed range. The preferred temperature for melt-polymerizing caprolactam to a homopolymer is from about 225° C. to about 295° C.

The polyamidation may be carried to completion at atmospheric pressure or under vacuum. The process may be continuous or batch type. Suitable processes are disclosed in U.S. Patent 2,071,253, 2,251,519, 2,647,-105, 2,805,214, for example. The melt blend thus prepared may be immediately and continuously spun to yarn, or it may be extruded, quenched, cut to flake and remelted, and thereafter spun. Unreacted monomer may be removed by vacuum or aqueous extraction.

The process of the present invention is especially adopted to non-aqueous polyamidation. By "non-aqueous" is meant polymerization by heating in the absence of other than catalytic amounts of water, i.e., less than about 5% of $H_2O$ (by weight, based on weight of polyamide-forming reactants).

By the term "poly(N-vinyl amide)" is meant a polymer produced by addition polymerization of an N-vinyl amide, such as an N-vinyl lactam or an N-vinyl, N-alkyl aliphatic amide, or copolymers of N-vinyl amides and one or more unsaturated monomers copolymerizable therewith, the N-vinyl amide component being present in major amount. Such copolymers are limited to those in which the component other than the vinyl lactam is present in such an amount that the N-vinyl lactam copolymer remains water soluble, even after heating at 225° C., is not degraded or decomposed at polyamide melting temperatures. Moreover, the copolymer component must not react appreciably with the fiber-forming condensation polymer under polymerization or melt spinning conditions. Concentration limits will obviously depend on the comonomer selected. In general, copolymer components which form water soluble homopolymers may be present in amount up to 49% of the copolymer. When the comonomer forms a water-insoluble homopolymer, it will usually be desirable to limit the comonomer to less than 30% of the copolymer.

The N-vinyl, N-alkyl aliphatic amides are described by the formula:

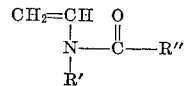

wherein R' and R" are members of the class consisting of H and lower alkyl. Preferably R' is methyl and R" is preferably H.

When the N-vinyl amide has a ring structure, i.e., that of a vinyl lactam, it is represented by the formula:

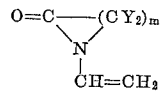

where Y is a member of the class consisting of hydrogen and lower alkyl, and $m$ is an integer between 2 and 6. The Y's may be the same or different.

The preferred vinyl lactams are the monomethyl substituted and unsubstituted N-vinyl pyrrolidones.

When polymerization and spinning temperatures do not exceed about 250° C., any of the defined class of poly(N-vinyl amides) may be used for blending with the polyamide. When temperatures in either polymerization and/or spinning exceed about 250° C., a poly(vinyl lactam) should be employed, due to the better thermal stability of these compounds.

Typical polyvinyl lactams which may be employed are N-vinylpropiolactam, N-vinylpyrrolidone, N-vinyl-N-valerolactam and N-vinyl caprolactam. The especially preferred poly(N-vinyl amide) is poly(N-vinyl 2-pyrrolidone.

An added advantage of the process of this invention is that it provides a method for producing an improved dispersion of polystyrene in the melt blend of poly(aminoacid or poly(lactam) and polyvinyl lactam. This is done by adding the desired amount of polystyrene, which may be between about 0.01 and about 30% by weight, to the blend at the end of the polymerization, when the blend is still at elevated temperature. If desired, however, the blend may be cooled and stored and polystyrene dispersed therein at some later time at elevated temperature. This elevated temperature is preferably between about 270 and about 290° C. At temperatures below about 270° C. the relatively high viscosity of the blend makes dispersion difficult. At temperatures above about 290° C. some degradation may occur. Hence, temperatures below about 270° C. and above about 290° C. are usually not practical.

Polyamide-forming amino acids or lactams which may be employed include pyrrolidone, n-valerolactam, caprolactam, n-heptylolactam, omega-amino caproic acid, omega-amino caprylic acid, omega-amino pelargonic acid, and omega-amino n-undecanoic acid.

The following examples are cited to illustrate the invention and are not intended to limit it in any manner.

*Example I*

227 grams of polyvinyl pyrrolidone of 40,000 molecular weight are dissolved in 2041 grams of molten caprolactam at about 90° C. and 16 grams of phthalic anhydride are added. The solution is charged to an autoclave and the polymerization of the caprolactam conducted following a conventional cycle wherein the autoclave, with temperature raised to 270° C., is kept at this temperature under 250 pounds per square inch pressure for 30 minutes. Then the pressure is reduced to atmospheric as quickly as practical in view of the possibility of foaming. Excess lactam monomer is thereafter removed by reducing the pressure to about 10 mm. mercury and maintaining this pressure at about 270° C., for about 2 hours under agitation. The molten polymer is then discharged as a ribbon by extruding it from the autoclave through a narrow slit. The ribbon is quenched on a water-cooled casting wheel and cut into ½-inch flake.

A yarn, melt spun from the flake, has a moisture regain of 7.4% at 75% relative humidity compared to 4.6% for unmodified 6-nylon, i.e., polycaproamide. A finished plain weave 76 picks, 120 ends taffeta fabric prepared from the yarn is creased in 26 p.s.i. superheated steam for 2 hours. The fabric is then ironed flat at 140° C. and allowed to recover by soaking in water. The crease recovery is measured and found to be 93.5% compared to 76.1% for unmodified 6-nylon.

*Example II*

An amount of 10 parts of poly(N-methyl,N-vinyl formamide) is dissolved in 100 parts epsilon-caprolactam (recrystallized from cyclohexane) containing 1.0 parts lithium hydride and 0.7 part sodium hydroxide, by heating under nitrogen at atmospheric pressure in a vessel jacketed at 218° C. Fiber forming viscosity is attained in about 90 minutes. The polymer mixture is heated under vacuum at 235° C. and 1 mm. mercury, to remove unreacted monomer. The polymer is extruded through a sand filter pack and spinneret to form yarn. The yarn is conventionally drawn and woven to fabric. When treated as shown in Example I, the test fabric has improved wet crease recovery as compared to an unmodified poly(caproamide) control.

*Example III*

A blend of polycaprolactam and polyvinyl pyrrolidone is prepared following the techniques of Example I. At the end of the polymerization 10 weight percent polystyrene is added at 270° C. under agitation. The molten polymer is discharged and formed into flake as in Example I and the flake is melt spun into a yarn. The yarn processes with fewer wraps and breaks than a similar yarn prepared from a blend of polyhexamethylene adipamide and polystyrene.

The invention broadly applies to polyamides prepared from amino acids or their polyamide-forming derivatives. The polyamides so prepared are polycarbonamides wherein the amide linkages are an integral part of the main polymer chain; they have the repeating units:

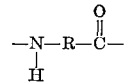

wherein R is $(CH_2)_z$ and $z$ is a whole number of from 4 to 11.

Many equivalent modifications of the above will be apparent to those skilled in the art from a reading of the above without a departure from the inventive concept.

This application is a continuation-in-part of U.S. application Serial No. 804,605, filed April 7, 1959, now abandoned.

What is claimed is:

1. A process for forming a homogeneous blend of a polyamide and a poly(N-vinyl amide) which comprises dissolving a poly(N-vinyl amide) in a molten polyamide-forming compound from the class consisting of an amino acid and a lactam, said system being non-aqueous and thereafter polymerizing the said polyamide-forming compound in the presence of an alkaline catalyst at a temperature of between about 185° C. and 300° C.

2. The process of claim 1 wherein the said polyamide-forming compound is caprolactam.

3. The process of claim 1 wherein the said poly(N-vinyl amide) is polyvinylpyrrolidone.

References Cited by the Examiner

UNITED STATES PATENTS

| | | | |
|---|---|---|---|
| 2,682,526 | 6/54 | Flory | 260—91.3 |
| 2,832,757 | 4/58 | Munch et al. | 260—78 |
| 2,958,677 | 11/60 | Kleinschmidt | 260—857 |
| 3,026,292 | 3/62 | Stanton et al. | 260—857 |
| 3,036,988 | 5/62 | Knospe | 260—857 |

MURRAY TILLMAN, *Primary Examiner.*

LEON J. BERCOVITZ, *Examiner.*